United States Patent
Khan et al.

(10) Patent No.: US 9,961,109 B2
(45) Date of Patent: May 1, 2018

(54) COMMUNICATION POLICY FRAME

(71) Applicant: Comcast Cable Communications, LLC, Philadelphia, PA (US)

(72) Inventors: Sohel Khan, Philadelphia, PA (US); Jon Boone, Coatesville, PA (US); Robert Lambardia, Castle Rock, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 819 days.

(21) Appl. No.: 13/826,254

(22) Filed: Mar. 14, 2013

(65) Prior Publication Data

US 2014/0280994 A1   Sep. 18, 2014

(51) Int. Cl.
*G06F 15/16* (2006.01)
*H04L 29/06* (2006.01)

(52) U.S. Cl.
CPC .......... *H04L 63/20* (2013.01); *H04L 63/0236* (2013.01); *H04L 65/1069* (2013.01); *H04L 65/1006* (2013.01)

(58) Field of Classification Search
CPC .. H04L 63/20; H04L 63/0236; H04L 65/1069
USPC ........................................ 709/229, 200, 217
See application file for complete search history.

(56) References Cited

U.S. PATENT DOCUMENTS

| | | | |
|---|---|---|---|
| 2002/0058506 A1* | 5/2002 | Amin et al. .................. | 455/432 |
| 2004/0213201 A1* | 10/2004 | Osterlund ..................... | 370/351 |
| 2005/0220095 A1* | 10/2005 | Narayanan et al. .......... | 370/389 |
| 2006/0077965 A1* | 4/2006 | Garcia-Martin .. | H04M 3/42195 370/352 |
| 2007/0086339 A1* | 4/2007 | Briggs ............... | H04L 12/5695 370/230 |
| 2009/0190533 A1* | 7/2009 | Zhu ................... | H04L 29/12188 370/328 |
| 2010/0146130 A1* | 6/2010 | Montemurro et al. ....... | 709/228 |
| 2010/0290455 A1* | 11/2010 | Erickson et al. ............. | 370/352 |
| 2011/0103372 A1* | 5/2011 | Shatsky et al. ............... | 370/352 |
| 2012/0254373 A1* | 10/2012 | Pujare et al. ................. | 709/220 |
| 2012/0303831 A1* | 11/2012 | Toshniwal .......... | H04L 65/1016 709/229 |
| 2012/0321062 A1* | 12/2012 | Fitzsimmons ...... | H04L 65/4015 379/142.17 |
| 2014/0006632 A1* | 1/2014 | Evens .......................... | 709/227 |
| 2015/0043453 A1* | 2/2015 | Hegarty ............. | H04L 65/1016 370/329 |

* cited by examiner

*Primary Examiner* — El Hadji Sall
(74) *Attorney, Agent, or Firm* — Banner & Witcoff, Ltd.

(57) ABSTRACT

Communication sessions may be initialized by sending an initialization request, and the request may include a frame of policy data identifying permissions, prohibitions and/or rules governing a requesting user or computing device's ability to make calls and use communication services. The policy frame of data may be included with the call initialization request for the session, and may be passed along to multiple nodes that receive the call initialization request.

18 Claims, 5 Drawing Sheets

| Customer Type | International or Grouping Type | Emergency Type | Local Transit Type | Directory Assistance | 900 Services | Future |
|---|---|---|---|---|---|---|

| 4 | 0 | 1 | 2 | 0 | 0 | 0 |
|---|---|---|---|---|---|---|

Figure 4b

COMMUNICATION POLICY FRAME

BACKGROUND

Communication networks continue to expand in their scope, and there is an increasing array of options for users to share information with one another. The increase in options, however, has increased the amount of supporting overhead communications that are needed. For example, a single voice call may require various different computing elements to consult with various different databases and resources to ensure that a requested communication session is permitted. The session may have to conform to various usage policies. There remains a constant need to more efficiently use the available resources.

SUMMARY

Below is a summary of various features described herein. These are merely examples, and are not intended to identify critical, most-important or key features or limit the appended claims. Instead, the claims' scopes should be ascertained in the context of the entire disclosure.

Some of the features described herein relate generally to establishing communications between computing devices, and when sending a request to establish a communication, also including succinct data that summarizes a range of policy permissions, restrictions and rules that govern the requesting user and/or computing device that is being used to request the communication.

In some embodiments, a call initiation request may be generated when a user wishes to initiate a communication session, such as a phone call or video chat invite. The initiating or calling party's computing device, or a device communicating with the calling party's device, may generate a policy frame and append it to the call initiation request. The policy frame may comprise data that identifies a variety of call permissions and prohibitions, which can allow the next node in the path towards the called party to process policy restrictions in a faster way, and minimize the number of times that node must make separate calls to various individual policy databases.

In some embodiments, the policy frame may be encapsulated into a Session Initiation Protocol (SIP) packet header, and the policy frame may accompany the call initiation request as it is passed through several intermediate nodes before arriving at the destination. In some embodiments, the policy frame may undergo translation when passing between nodes that implement different data values for policy frame values.

These and other aspects will be described in connection with the drawings in the Detailed Description portion of this disclosure.

BRIEF DESCRIPTION OF THE DRAWINGS

FIGS. 4a&b illustrate example policy frames.

DETAILED DESCRIPTION

Figure 1:
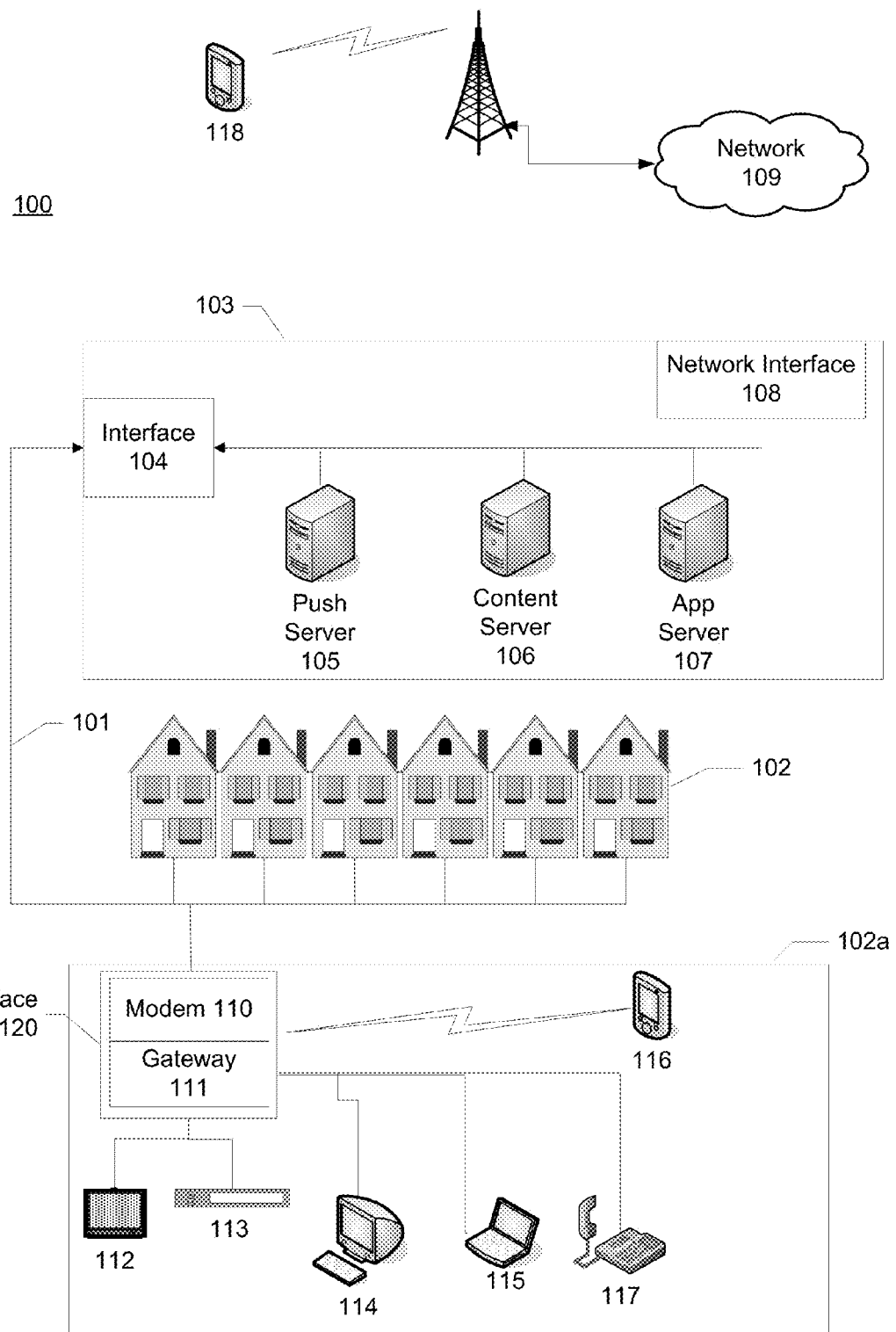
FIG. 1 illustrates an example system on which features described herein may be implemented.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a data processing facility, a headend, central office, a processing facility, etc.). The local office 103 may transmit downstream information signals onto the links 101, and each premises 102 may have a receiver used to receive and process those signals. The geographic location of the local office 103 can vary, and the local office 103 may be proximate to a user's neighborhood in some embodiments, while in other embodiments, the local office 103 may be remotely located at a centralized location. The various servers may be located anywhere, and their location need not be relevant to a user (e.g., the servers may be in the "cloud").

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The various premises 102 may be connected (through wiring and/or wireless connections) to one another, forming a local premises access network operationally distinct from another local access network. The connected homes forming a local premises access network may be located near one another, such as neighboring townhomes, individual apartments in a downtown highrise, or the like. For example, a local premises access network may include the various premises 102. Another group of homes (not shown) may form a separate local premises access network. The local premises access network of the various premises 102 may be identifiable from the separate local premises access network. A local premises access network may also be associated with a particular geographic region (e.g., city, county, geographic area, etc.). In some embodiments, homes connected to a termination system (TS), such as a modem termination system (MTS), may form a local premises access network.

The local office 103 may include an interface 104, such as a termination system (TS) or a cable modem termination system (CMTS) in an example of an HFC-type network, which may be a computing device configured to manage communications between devices on the network of links 101 and backend devices such as servers 105-7 (to be discussed further below). In the example of an HFC-type network, the MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., LTE, WiMAX, etc.), satellite networks, and any other desired network, and the interface 108 may include the corresponding circuitry needed to communicate on the network 109, and to other devices on the network such as a cellular telephone network and its corresponding cell phones. Collectively, these networks 109 may be referred to herein as "the cloud" or "cloud architecture."

As noted above, the local office 103 may include a variety of servers that may be configured to perform various functions. For example, the local office 103 may include a back office server 105. The back office server 105 may generate push notifications related to functions such as billing, reporting, and subscriber management 400 to deliver data and/or commands to the various premises 102 in the network (or more specifically, to the devices in the premises 102 that are configured to detect such notifications). The local office 103 may also include a content server. The content server 106 may be one or more computing devices that are configured to provide content to users, who may be, for example, in the homes. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device. Other server computing devices may be present as well. Also, the various servers and elements are depicted in a local office 103, but they need not be co-located in a common premises, and instead may have some or all elements remotely in the network 109.

The local office 103 may also communicate with one or more application servers 107 maintained in the cloud 109. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102a may include an interface 120, which may include a modem 110 (or another receiver and/or transmitter device suitable for a particular network), which may include transmitters and receivers used to communicate on the links 101 and with the local office 103. The modem 110 may be, for example, a coaxial cable modem (for coaxial cable lines 101), a fiber interface node (for fiber optic links 101), or any other desired modem device. The modem 110 may be connected to, or be a part of, a gateway interface device 111. The gateway interface device 111 may be a computing device that communicates with the modem 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops and netbooks, mobile phones, mobile televisions, tablet computers, PDA, etc.), telephones 117, and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), 3G, WiMax, LTE, Bluetooth interfaces, and others. In some embodiments, the system uses ZigBee and Z-Wave compliant devices.

Figure 2:
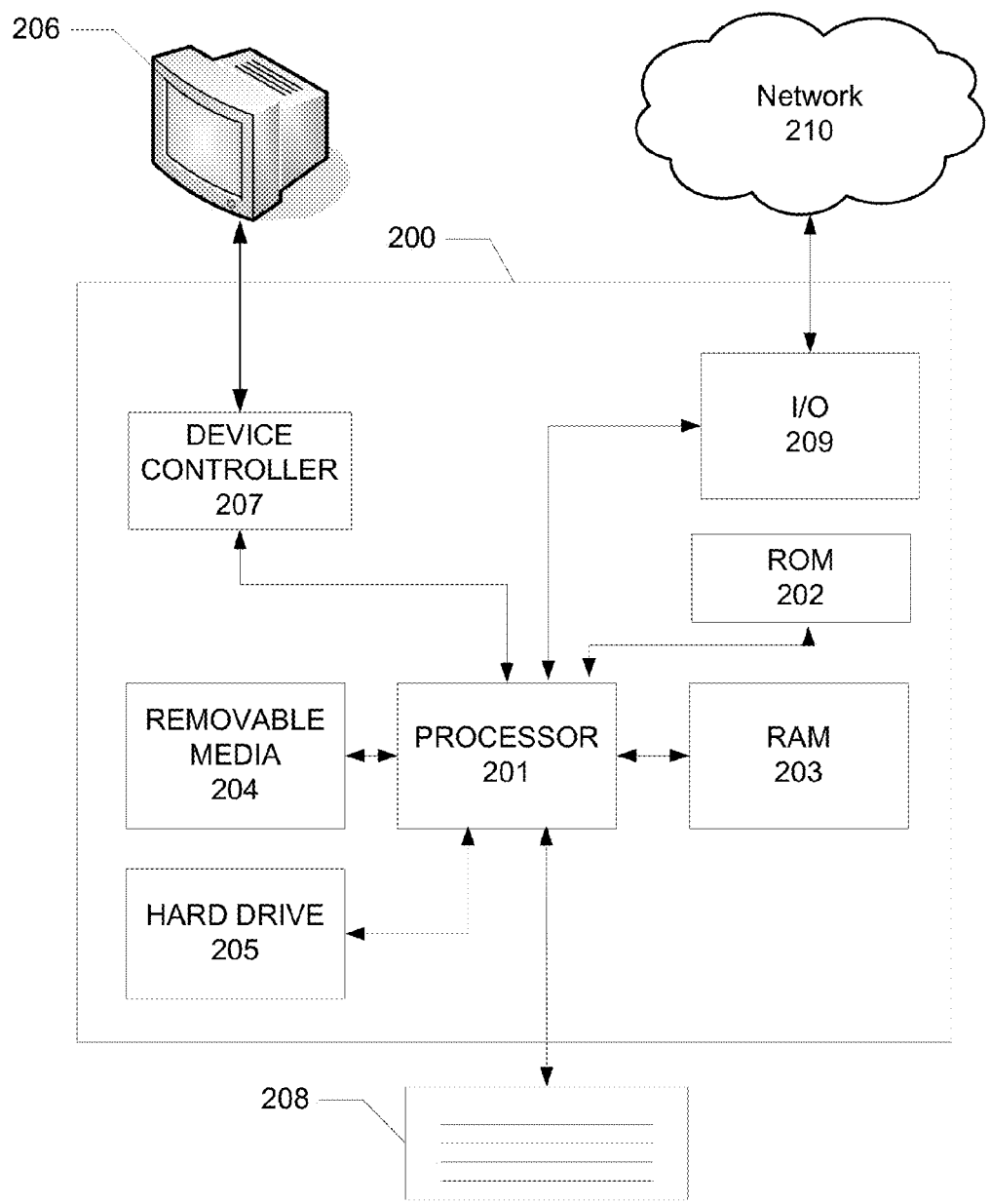
FIG. 2 illustrates an example computing device that may be used to implement any of the computing devices and servers described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As discussed above, the local office of an information distribution or access network may transmit information downstream to various user devices. The transmitted information may include content (e.g., audio, video, Internet data, etc.) for consumption (e.g., playback, viewing, listening, display, storage, etc.) by a user via user equipment, such as a gateway interface device (e.g., gateway interface device 111 of FIG. 1) and/or other computing device (e.g., televisions 112, additional STBs 113, personal computers 114, laptop computers 115, wireless devices 118 of FIG. 1). To assist in providing the content to a user, a content provider may implement in their distribution network an information distribution management system that includes one or more information distribution management devices (e.g., one or more servers and/or other devices) configured to perform various processes related to managing the providing of content to the user equipment (e.g., user device). The features will be described hereinbelow primarily in connection with an embodiment in a television service network, such as a cable television network. However, it should be understood that this is merely exemplary. The features may be implemented in connection with any form of media content, including audio content, video content, and multimedia content, and in connection with any number of delivery mechanisms for such content, including television networks, media delivered via the Internet or another information network, media stored on any digital medium, including, but not limited to, DVDs, CDs, solid-state memory, and hard disk drives such as found in computers and DVRs.

Figure 3:
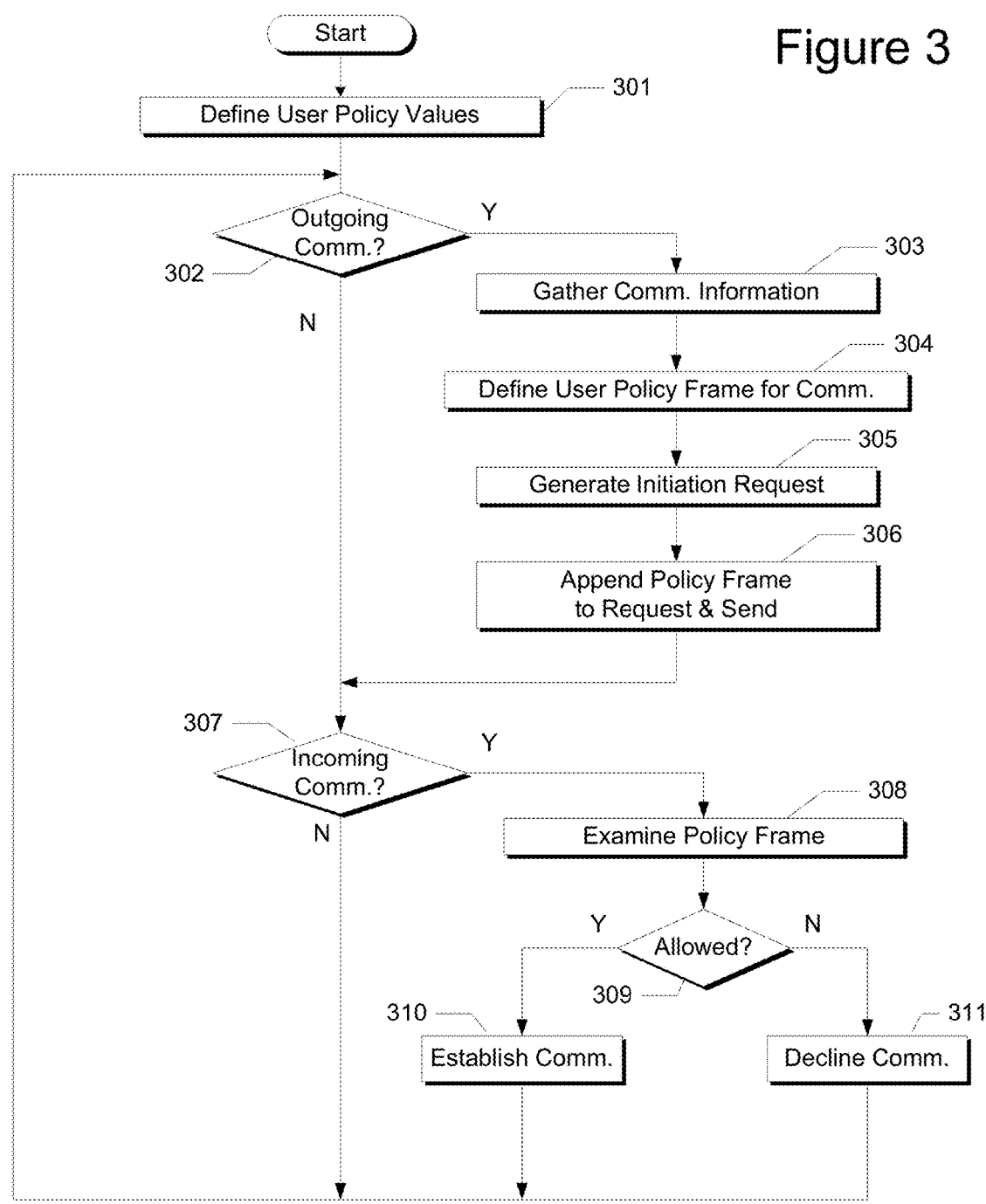
FIG. 3 illustrates an example call process employing various features described herein.

FIG. 3 illustrates an example communication processing flow (e.g., telephone call processing) that can be performed by any computing device that is capable of external communications. For example, a voice-over-Internet Protocol (VoIP) capable phone 117, cell phone 116 or computer 114/115 may perform some or all of the described steps. The discussion will be made in conjunction with the policy frames illustrated in FIGS. 4a&b, and with the signaling flow shown in FIG. 5. Also, the example below uses telephone call processing, which can be analog twisted-pair, Voice Over IP, or any other desired form of voice communication, as an example, but the calls herein may be any other type of messaging communication. For example, video chat sessions and calls can also be handled with the features described herein, and the calls may be any type of communication session.

As illustrated, in step 301, the computing device may first define one or more communication policy values for a user of the device, and/or for the device itself. The communication policy values may indicate the types of restrictions and permissions that are to govern a particular user and/or computing device. Specific example policy values are described further below, but in general, the policy values may indicate types of calls (e.g., communication sessions) that the user is permitted to make, types of services that the user is permitted to invoke, restrictions on how a requested call is to be routed, etc.

Defining the user's policy values may be done as part of establishing the user's calling service. If the user signs up for a certain package of services with the user's local phone service provider (e.g., a VoIP provider), then that package of services may define the types of permissions and restrictions applicable to the user, or to the user's computing device.

In step 302, the computing device may determine whether a user has requested to make an outgoing call from the computing device. The requested outgoing call may be a voice call, audiovisual call, video call, or any other desired form of initiating communication. This may be done, for example, by opening a voice call application on the computing device, and entering in an identifier of a desired called party (e.g., a telephone number, an email address, a video call address, or any other identifier). In the example below, references to the calling party and called party may refer to the individual user requesting a communication session and receiving a request for a communication session, or any computing device doing the same.

If an outgoing call is requested, then in step 303, the computing device may gather information regarding the call. The gathered information may include information identifying the computing device making the call (e.g., a Media Access Control, or MAC, address, or an Internet Protocol, or IP, address), an account making the call (e.g., a calling party phone number, calling party account number, email address, etc.), and a call destination (e.g., a called party phone number, account number, email address, MAC address, IP address, etc.).

In step 304, the computing device may formulate the policy frame for the requested call. The frame may be any type, format, or grouping of call configuration data. FIG. 4a illustrates an example policy frame 401, while FIG. 4b illustrates an example frame having decimal values in the fields. The policy frame 401 may be a data packet containing a plurality of data fields for a variety of call policies. In the illustrated example, there may be a Customer field, an International Call field, a Toll Free field, an Emergency field, a Local Transit field, a Directory Assistance field, a 900-Services field and one or more other fields reserved for future use. Each of these fields may contain a data value, such as an integer from 0-9, to indicate a parameter for the user's call policy.

The Customer field may identify the kind of network services to which the calling customer is entitled. For example, data carrying services may offer wholesale data services, in which a first data carrier (e.g., a cable company) may agree to carry data traffic for a second data carrier (e.g., a twisted-pair telephone company). In such arrangements, the first data carrier may offer the second data carrier's service to the first data carrier's customers. The Customer field may indicate the types of data arrangements that are applicable to the calling customer, and may other characteristics, such as the user's device connection type (e.g., a time-division multiplex-TDM-connection, an Internet Protocol-IP-connect, etc.). In some example embodiments, the data field may have the following defined values:

1=Direct Customer of Data Carrier A. The customer receives data service from data carrier A, with no restrictions on the data networks that the customer's data is permitted to traverse.

2=Direct Customer of Data Carrier A, Via Data Carrier B. The customer's premises is connected to Data Carrier A, and communicates initially with Data Carrier A's network, but the customer's service is ultimately provided by Data Carrier B. In operation, Data Carrier A communicates with the customer's device, and then conveys the signaling to a corresponding computing device of Data Carrier B. In other words, Data Carrier A is a middleman for Data Carrier B to reach the customer.

3=Direct Customer of Data Carrier A, Via Data Carrier B or C. The customer's premises is connected to Data Carrier A, but his/her data is permitted to travel through networks of Data Carriers B or C, or be serviced by either network. If desired, additional conditions may apply for determining which of B or C to use.

The International field may indicate the degree to which international calls are permitted for this calling user. In some embodiments, this field can indicate any geographical region, and need not be limited to international geographic groupings This data field may have, for example, the following defined values:

0=customer is not permitted to make international calls
1=customer is only permitted to call Canada and Mexico
2=customer is only permitted to call Europe
3=customer is only permitted to call Asia
4=customer is only permitted to call Canada, Mexico and Europe
5=customer is only permitted to call devices located in Zip Code 12345
6=customer is only permitted to call devices that are serviced by the same local office 103 as the customer's home.
9=customer is allowed to call anywhere in the world Any number of different data fields may be used to represent any collection of geographic regions for billing purposes.

The Toll Free field may indicate the degree to which the calling user is permitted to use toll free calling services. This data field may have, for example, the following defined values:

0=customer is not permitted to make toll free calls
1=customer is permitted to make toll free calls The Emergency field indicates the degree to which the calling party is eligible for emergency services. Example field values may be as follows:

0=customer is only permitted to make 911 calls (e.g., this policy could be applied to a deactivated phone)
1=customer is allowed to make 911 calls, and other calls too
2=customer is not allowed to make 911 calls, but can make other calls The Local Transit field indicates a user's local calling region. Calls made from the user to other destinations in the user's local calling region may incur fewer, or no, charges, as compared to charges for making longer distance calls. The regions may be identified in any desired format, such as by calling server, switch, trunk connection, or any other desired geographical grouping.

0—customer may make calls to the same switch only
1—customer may make calls within a group or range of the calling customer's switch
2—customer may make calls within a larger range or group.

The Directory Assistance field indicates the degree to which the calling customer is entitled to receive directory assistance, such as live operator assistance with making a call. Example field values may be as follows:

0=customer is not entitled to receive directory assistance
1=customer is entitled to receive directory assistance at no charge
2=customer is entitled to receive directory assistance, but at a rate of $0.99 per minute.

The 900 Services field indicates the degree to which the calling customer is entitled to place 900 calls, or calls in which the caller may incur additional service charges for services received in response to the call. For example, a telephone service may charge a per-minute rate (e.g., $0.99 per minute) to speak with subject matter experts on a particular topic. Example field values may be as follows:

0=customer is not entitled to make a 900-service call
1=customer is only entitled to make 900-service calls to numbers that charge less than $2 per minute
9=customer is entitled to access any desired 900-service Other policy fields may be used as well. Any permission or prohibition on a user's (or computing device's) ability to establish communication sessions or use communication services may be expressed in the policy frame's fields. Although the example frame 401 has eight fields, these are mere examples, and any desired number of fields may be used in the frame.

Figure 5:
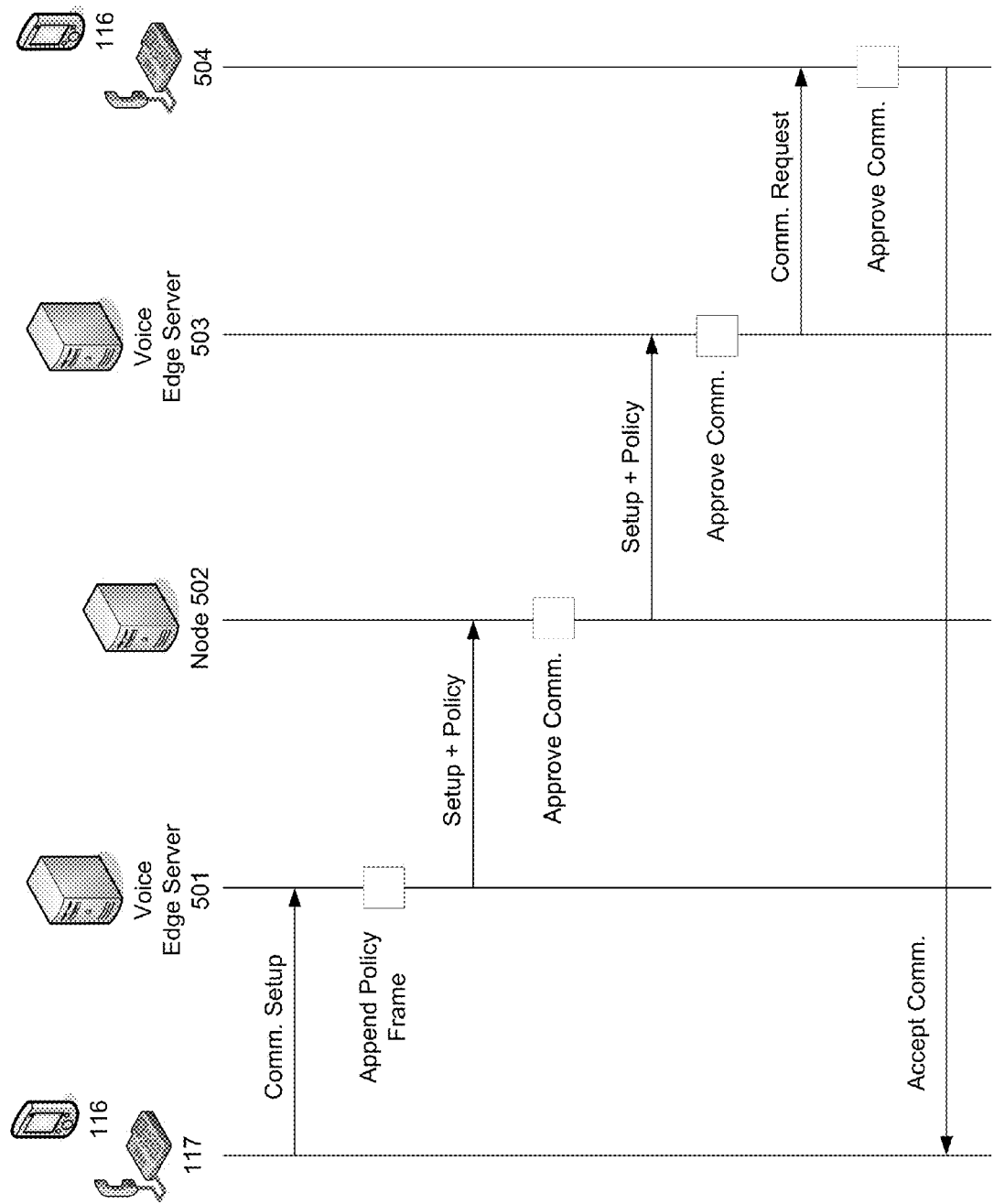
FIG. 5 illustrates an example call signaling flow.

In step 305, the computing device may generate a call initiation request for the requested outgoing call. The request may be, for example, a Session Initiation Protocol (SIP) invite message used to initiate a VoIP session. The call initiation request may include any parameters necessary for the call, depending on the particular protocol used for the call (e.g., SIP parameters for a SIP call). In some embodiments, that delivery may be to a voice service edge server. The voice service edge server may be part of the gateway 111, or implemented as an application server 107 at the local office 103, or it may be at a location further upstream in the network 109. The voice service edge server may be a computing device configured to receive requests for voice sessions, and to process them to establish a connection with the called party to the session. FIG. 5 illustrates an example signaling flow, and illustrates an example in which a device (e.g., a calling wireless phone 116 or phone 117) initiates a call by sending a call setup message to the voice edge server 501 (e.g., in the gateway 111 or at an app server 107).

In step 306, the computing device may append the policy frame to the call initiation request, and transmit the request and policy frame together to the appropriate server for handling the call. The appending can be done within the formatting of the communication protocol for the requested call. For example, if the request is to initiate a SIP session, the policy frame information may be embedded within a header of a SIP invite message. The policy frame may also be encrypted or otherwise encoded before being appended to the call initiation request.

In the FIG. 5 example, the voice service edge server 501 may append the policy frame, and then send the combined call setup request and policy frame to the next node 502 towards the requested called party destination. The voice service edge server 501 may consult routing tables based on the calling and called party identifications in the call initiation request to determine the next node 502 for establishing the session. The call request and policy frame may be passed from node to node, although when it reaches the destination 504, the policy frame may be stripped out, since the destination may simply receive the call. In alternative embodiments, the policy frame may be passed to the destination 504 as well, if the destination network is configured to make determinations as to whether to accept an incoming call.

Although only one intermediate node 502 is shown between the originating voice service edge server 501 and the destination voice service edge server 503 (a corresponding server that is responsible for calls to and from the destination computing device), an actual call session may involve traversing multiple nodes 502 before the destination voice service edge server 503 is reached. For example, some embodiments may use jurisdictional analyzers, session border controls, and other components along the route to the destination. At each of the nodes and servers and the destination device, the call request and its appended policy frame may be examined to identify the next node towards the destination, and the policy frame may be consulted to confirm that the requested call is permitted to occur under the terms of the user's policy. By including the policy frame data with the call setup request as it is passed from node to node, the nodes 502 and servers 501/503 may each receive a succinct identification of the called party's call policies and permissions/prohibitions, and can quickly determine whether the requested call should be authorized and passed along. In the absence of the policy frame, these intermediate nodes 502 may be required to consult multiple databases on behalf of the calling party (e.g., consulting a 900 services database, and then an emergency calls database, and so forth) to determine whether the requested call is within the calling party's calling parameters. In some embodiments, the intermediate nodes may include nodes from a plurality of different administrative domains, or nodes having different ownership, and policy frame translation may be implemented to accommodate differences in how now the different owners have encoded their policy frame data.

The intermediate nodes 502 and servers 501/503 may store one or more routing tables identifying the next node suitable for a given call request. The routing tables may include various conditions that can be based on the policy frame in the call initiation request. For example, a node routing table may contain one or more conditional responses based on the value for a particular field in the policy frame, such as the Customer field. For example, a node's routing table may indicate that a call whose policy frame Customer field value is 1 (e.g., TDM-originated customer, or non-enhanced customer) is permitted to be terminated with a first group of devices (e.g., devices associated with a first service provider, or devices of a first type, such as SIP or TDM devices), but that the call should not be permitted to be terminated with a second group of devices (e.g., devices associated with a second service provider, different from the first service provider). This different treatment may be due, for example, on the fact that the telephone devices at the first service provider are able to handle TDM calls, while the second provider's devices are not able to handle TDM calls. For example, call policy may allow some wholesale customers to reach TDM networks, while other wholesale customers cannot reach TDM In such an embodiment, the routing table may direct calls whose policy frames have Customer value of 1 to a first node, and those with Customer value of 4 to a second node different from the first. The routing table may also indicate that for certain predetermined destinations (e.g., those in the second group of devices discussed above), the call should simply be denied, and that the requesting caller be provided with a suitable denial message.

In some embodiments, the routing table may indicate multiple conditions. For example, the table may indicate that the call should first be forwarded to a TDM node 502 or voice service edge server 503, but if that node or server should decline the request (e.g., due to overload or error conditions, or policy violation), then the request can be returned to the forwarding node, which may then try to forward the request to another alternate node. For example, the table may indicate that if the call is rejected by the TDM node, then the request should be forwarded to a wholesale LCR (Local, Intra-state) node for processing, and if that fails as well (or is declined), then an error or failure message should be returned to the originating computing device.

In some embodiments, the frame policy may apply to a plurality of users and/or computing devices. For example, a wholesale policy frame may be defined and used by a voice service edge server 501 to apply to all devices that use the server 501 to request a call. So, for example, if the server 501 were an application server 107 at a local office 103, then all call requests made by premises served by the local office 103 may receive the same policy frame.

As noted above, the policy frame for a given user or computing device may be generated at the time a communication session is requested, and may accompany the request throughout its traversal of the nodes and/or servers needed to establish the requested communication session. At each stage, any device examining the communication request may also inspect the appended policy frame to quickly identify the usage restrictions that are to be applied to the requesting user and/or computing device. In some embodiments, intermediate nodes 502 may choose to modify certain values in the policy frame. A modification of the frame may be used, for example, if the frame and call request are traversing between two different networks. Different networks may use different values in their policy frames (e.g., a '1' in the 911 call field may have a different meaning between the different networks).

Returning to the FIG. 3 process, in step 307, the computing device may determine whether it has received a call initiation message from a remote computing device, indicating the request for an incoming call. If it has, then in step 308, the computing device may examine the call initiation message to extract the policy frame for the calling computing device or user, and check to determine whether the requested call is permitted given the calling party's policy. If it is permitted, then in step 310, the computing device may transmit a responsive message to the calling party's computing device, and proceed with establishing the requested session. If it is not permitted, then in step 311, the computing device may transmit a responsive message to the calling party's computing device, informing the computing device that the requested call has been declined, and providing data indicating the policy that prohibited the call.

The steps of receiving the call initiation message 307 and examining the policy frame 308 may also be performed at the one or more intermediate nodes 502 and servers 501/503 between the calling device and the called device. Those intermediate elements may also examine the policy to determine whether the requested session should be permitted, and can respond by either forwarding the request to the next step towards the destination, or returning a denial message if the policy prohibits the requested session. The intermediate nodes could also deny a call if, for example the node is overloaded, or if the node lacks resources required for the call, or any other desired reasons.

The various features described above are merely examples, and variations may be made within the scope of this disclosure. For example, the various steps in the process flows may be rearranged as desired, steps may be omitted, duplicated, and/or other steps may be inserted. The various components described above may be hardware, software, or a mixture of both, and they may be combined, divided and rearranged as desired to achieve the same objectives. The scope of this patent should only be defined by the claims that follow.

The invention claimed is:

1. A method comprising:
   receiving, by a computing device, a communication request;
   determining multiple call policies associated with the communication request;
   generating a header comprising data indicating the multiple call policies, wherein the header comprises a plurality of data fields respectively corresponding to different ones of the multiple call policies, and each of the plurality of data fields indicates a permission level of a respective one of the multiple call policies; and
   transmitting a communication initiation request comprising the communication request and the header.

2. The method of claim 1, wherein the header is encapsulated in a common packet with the communication initiation request.

3. The method of claim 1, wherein the transmitting the communication initiation request comprises transmitting the communication request and the header together through a plurality of computing nodes between a device sending the communication request and a destination device.

4. The method of claim 3, further comprising:
   passing the communication initiation request through intermediate nodes of different administrative domains; and
   translating the header from one administrative domain format to another when passing the communication initiation request through the intermediate nodes.

5. The method of claim 1, wherein the communication initiation request is a Session Initiation Protocol (SIP) invite message, and the header is inserted into the SIP invite message.

6. The method of claim 1, further comprising adding the header to a plurality of communication initiation requests for a plurality of different communication computing devices.

7. A method comprising:
   receiving, by a computing device, a communication initiation request with a Session Initiation Protocol (SIP) header, wherein the SIP header comprises data indicating multiple call policies associated with the communication initiation request, the SIP header comprises a plurality of data fields respectively corresponding to different ones of the multiple call policies, and each of the plurality of data fields indicates a permission level of a respective one of the multiple call policies; and
   identifying a next node for establishing communication, and forwarding the communication initiation request with the SIP header to the identified next node.

8. The method of claim 7, wherein the multiple call polices comprise information identifying a plurality of international country permissions applicable to a user making the communication initiation request.

9. The method of claim 7, further comprising determining that the identified next node is of a different administrative domain different from an administration domain from which the communication initiation request is forwarded, and translating the SIP header to correspond to a format used by the different administrative domain.

10. The method of claim 7, wherein the SIP header is encapsulated in a common packet with the communication initiation request.

11. The method of claim 7, further comprising:
   including the SIP header in the communication initiation request when passing the communication initiation request through a plurality of intermediate nodes between a party initiating the communication and a receiving party, and
   removing the SIP header from the communication initiation request prior to passing the communication initiation request to the receiving party.

12. A computing device comprising:
   a processor; and
   a memory, storing instructions that, when executed by the processor, cause the following to occur:
      receive a communication request;
      generate a plurality of headers each of which comprises data indicating multiple call policies associated with the communication request, wherein each of the plurality of headers comprises a plurality of data fields respectively corresponding to different ones of the multiple call policies, and each of the plurality of data fields indicates a permission level of a respective one of the multiple call policies; and
      transmit a communication initiation request comprising the communication request and the plurality of headers.

13. The computing device of claim 12, wherein the plurality of headers are encapsulated in a common packet with the communication initiation request.

14. The computing device of claim 12, wherein the memory further stores instructions that cause the following to occur:
   transmit the communication request together with the plurality of headers through a plurality of computing nodes between a device requesting communication and a destination device, and
   translate one or more of the plurality of headers from one administrative domain format to another when passing the communication initiation request through the plurality of computing nodes.

15. The computing device of claim 12,
   wherein the permission level comprises a first level for calls to a first geographic region and a second level for calls to a second geographic region.

16. The computing device of claim 12, wherein one of the plurality of headers comprises information indicating a plurality of international country permissions applicable to a user making the communication request.

17. The computing device of claim 14, wherein the memory further stores instructions that cause the following to occur:
   include the plurality of headers in the communication initiation request when passing the communication initiation request through a plurality of intermediate nodes between a party making the communication and a receiving party.

18. The method of claim 1, wherein one of the multiple call policies comprises permissions for two or more data carriers applicable to a user making the communication request.

* * * * *

UNITED STATES PATENT AND TRADEMARK OFFICE
CERTIFICATE OF CORRECTION

PATENT NO. : 9,961,109 B2
APPLICATION NO. : 13/826254
DATED : May 1, 2018
INVENTOR(S) : Khan et al.

It is certified that error appears in the above-identified patent and that said Letters Patent is hereby corrected as shown below:

In the Specification

Column 2, Detailed Description, Line 54:
Please delete "105-7" and insert --105-107--

Column 9, Detailed Description, Line 48:
After "TDM", insert --.--

Signed and Sealed this
Eighth Day of January, 2019

Andrei Iancu
*Director of the United States Patent and Trademark Office*